(12) United States Patent
Gauthey et al.

(10) Patent No.: US 7,925,662 B2
(45) Date of Patent: Apr. 12, 2011

(54) METHOD AND APPARATUS FOR GENERATING CSV-FORMATTED EXTRACT FILE

(75) Inventors: Philippe Gauthey, Paris (FR); Jan van Kan, Mareil-Marly (FR); Frederick H. Buckley, Hudson, MA (US); Peter G. McCullough, Southborough, MA (US)

(73) Assignee: Computer Associates Think, Inc., Islandia, NY (US)

( * ) Notice: Subject to any disclaimer, the term of this patent is extended or adjusted under 35 U.S.C. 154(b) by 305 days.

(21) Appl. No.: 10/889,231

(22) Filed: Jul. 12, 2004

(65) Prior Publication Data

US 2005/0131928 A1 Jun. 16, 2005

Related U.S. Application Data

(60) Provisional application No. 60/487,062, filed on Jul. 11, 2003.

(51) Int. Cl.
*G06F 7/00* (2006.01)
(52) U.S. Cl. ........................................ 707/769; 707/709
(58) Field of Classification Search .................. 707/769, 707/709
See application file for complete search history.

(56) References Cited

U.S. PATENT DOCUMENTS

| | | | |
|---|---|---|---|
| 5,978,940 A * | 11/1999 | Newman et al. | 714/712 |
| 5,987,633 A | 11/1999 | Newman et al. | 714/712 |
| 6,873,841 B1 * | 3/2005 | Sagar | 455/414.4 |
| 2002/0083042 A1 | 6/2002 | Sasoh | 707/1 |
| 2002/0154751 A1 * | 10/2002 | Thompson et al. | 379/114.01 |
| 2002/0194217 A1 | 12/2002 | Hoffman et al. | 707/503 |
| 2004/0210878 A1 * | 10/2004 | Pagnano | 717/136 |

OTHER PUBLICATIONS

European Patent Office supplementary European search report under Article 153(7) EPC; Reference: HCD/J00048451EP; Application No./Patent No. 04777948.3-1527 / 1709553 PCT/US2004022173, Jul. 24, 2009.

European Patent Office Communication Pursuant to Article 94(3) EPC; Application No. 04 777 948.3-1527; dated Nov. 18, 2009; reported Dec. 15, 2009.

* cited by examiner

*Primary Examiner* — Charles Rones
*Assistant Examiner* — Belix M Ortiz
(74) *Attorney, Agent, or Firm* — Baker Botts L.L.P.

(57) ABSTRACT

Methods, systems, apparatus and computer-readable media are disclosed for generating extract files. A first example method is disclosed for generating an extract file. The method includes receiving a data request and analyzing the data request to identify at least one record of at least one file containing data associated with the data request. The method also includes extracting the identified records and formatting the identified records according to a comma separated value format. The method further includes outputting an extract file containing the formatted records. Other methods, apparatus, systems and computer readable media are disclosed for generating extract files.

21 Claims, 5 Drawing Sheets

METHOD AND APPARATUS FOR GENERATING CSV-FORMATTED EXTRACT FILE

CROSS REFERENCE TO RELATED APPLICATIONS

This application claims priority to and incorporates by reference the entirety of U.S. provisional application entitled "Method and Apparatus for Formatting CSV-Formatted Extract File," Ser. No. 60/487,062, filed Jul. 11, 2003.

TECHNICAL FIELD

The described methods and apparatus are generally related to information processing environments in which data is extracted, formatted and exported. More specifically, the described methods and apparatus are related to formatting source data into a non-proprietary file format.

BACKGROUND

Software systems commonly make use of application-specific data formats. Such data formats, being somewhat unique to the individual software system, are not necessarily recognized by third-party applications. In some cases, the data formats may be proprietary to a particular software application making such data formats difficult to access by other software systems.

When the user of such a software system has the need to import data from the software system into third-party applications or to otherwise access the software system's data, considerable development time and expense may be expended to derive the source data format. For example, an end-user of the above described software system may wish to generate customized reports based on data used by the software system. Without prior knowledge of the source software system's data format a significant amount of development time may be expended to derive this foreign data format.

Some software systems enable the importing and exporting of widely accepted file formats, such as the Comma Separated Value ("CSV") format, for example. Data formatted in CSV uses a separator character, usually a comma, to separate each field in the record. A double separator represents blank or unfilled fields. The field contents can be surrounded by quotes or double quotes, in case the value contains a comma or embedded blanks. Unfortunately, certain proprietary software systems do not enable users to export to such widely accepted formats.

Consequently, there is a need for methods and apparatus that address the shortcomings of prior art software applications that fail to enable data to be exported in a widely recognized file format. A need exists for methods and apparatus to access data in an application specific file format and generate an export file in a widely recognized, non-proprietary file format.

SUMMARY

The following presents a simplified summary of methods, apparatus, systems, and computer readable media associated with generating an extract file in accordance with the present application. This summary is not an extensive overview and is not intended to identify key or critical elements of the methods, apparatus, systems, and/or media or to delineate the scope of the methods, apparatus, systems, and media. It conceptually identifies the methods, apparatus, systems, and media in a simplified form as a prelude to the more detailed description that is presented later.

In accordance with one aspect of the present application, an example method is disclosed for generating an extract file. The method includes receiving a data request and analyzing the data request to identify at least one record of at least one file containing data associated with the data request. The method also includes extracting the identified records, and formatting the identified records according to a comma separated value format. The method further includes outputting an extract file containing the formatted records.

In accordance with a second aspect of the present application, an example apparatus is disclosed for generating an extract file. The apparatus includes a processor and a memory in communication with the processor. The memory stores a program to control the operation of the processor. The processor is operative with the program in the memory to receive a data request. The processor is also operative with the program in the memory to analyze the data request to identify at least one record of at least one file containing data associated with the data request. The processor is further operative with the program in the memory to extract the identified records and format the identified records according to a comma separated value format. The processor is still further operative with the program in the memory to output an extract file containing the formatted records.

In accordance with a third aspect of the present application, an example computer-readable storage medium is disclosed. The medium is encoded with processing instructions for generating an extract file.

Certain illustrative aspects of the methods, apparatus, systems and computer-readable media are described herein in connection with the following description and the annexed drawings. These aspects are indicative, however, of but a few of the various ways in which the principles of the methods, apparatus, systems, and media may be employed and thus the examples are intended to include such aspects and equivalents. Other advantages and novel features may become apparent from the following detailed description when considered in conjunction with the drawings.

BRIEF DESCRIPTION OF THE DRAWINGS

For a more complete understanding of the present methods and systems, reference is now made to the following description taken in conjunction with the accompanying drawings in which like reference numbers indicate like features and wherein.

DETAILED DESCRIPTION

Figure 1:
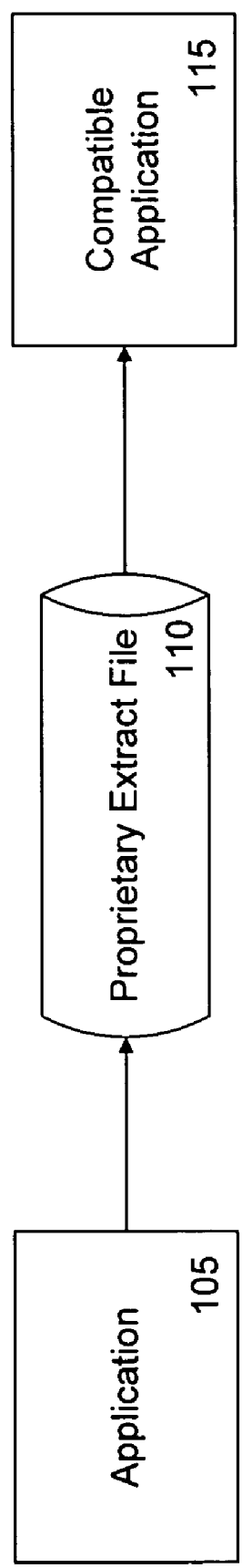
FIG. 1 is a block diagram illustrating an example processing environment in which data is exported and imported between compatible software applications.

Example methods and systems are now described with reference to the drawings, where like reference numerals are used to refer to like elements throughout. In the following description, for purposes of explanation, numerous specific details are set forth in order to facilitate thoroughly understanding the methods and systems. It may be evident, however, that the methods and systems can be practiced without these specific details. In other instances, well-known structures and devices are shown in block diagram form in order to simplify the description.

Referring to FIG. 1, a schematic block diagram illustrates an example information processing environment 100 in which data may be exported from a first software application 105 and imported into a second software application 115 which is compatible with the first application 105. The transfer of data is accomplished via an extract file 110 having a proprietary format which is generated by the first application 105. Environment 100 illustrates a common relationship between compatible applications.

Figure 2:
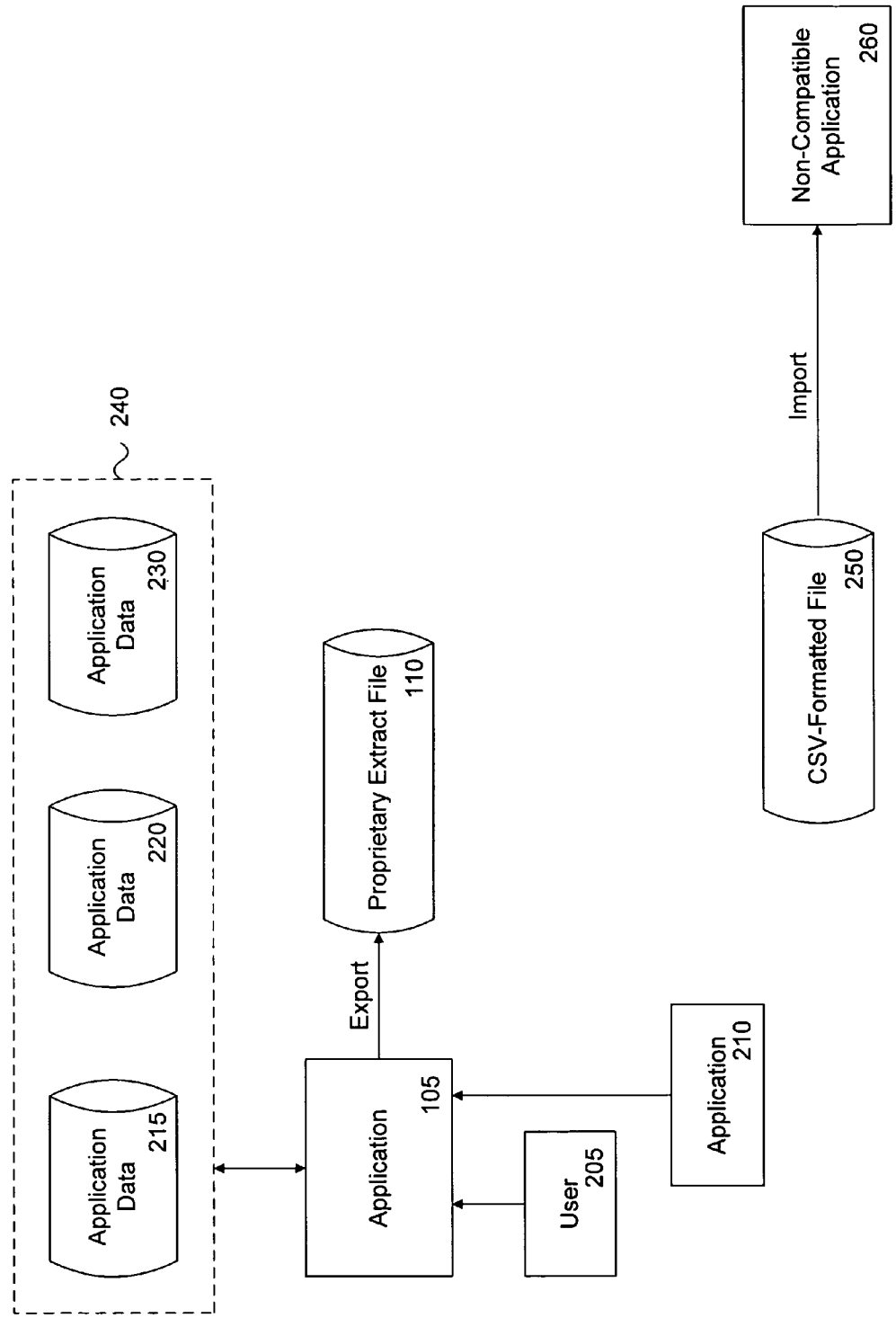
FIG. 2 is a block diagram illustrating an example processing environment in which data exported from a first software application may not be compatible with a second software application.

Referring to FIG. 2, a schematic block diagram illustrates a second example information processing environment 200 in which extract file 110 exported from software application 105 is incompatible with a second software application 260. As illustrated, a user 205 or application 210 may request application 105 to generate extract file 110. Application 105 generates the extract file 110 based on an example store of application data 240. The example store of application data includes application data files 215, 220 and 230.

As shown, the extract file 110 generated by application 105 may is not compatible with application 260 which is incapable of determining the proprietary format of the extract file 110, but which is capable of importing files having non-proprietary file formats such as CSV formatted file 250, for example.

Figure 3A:
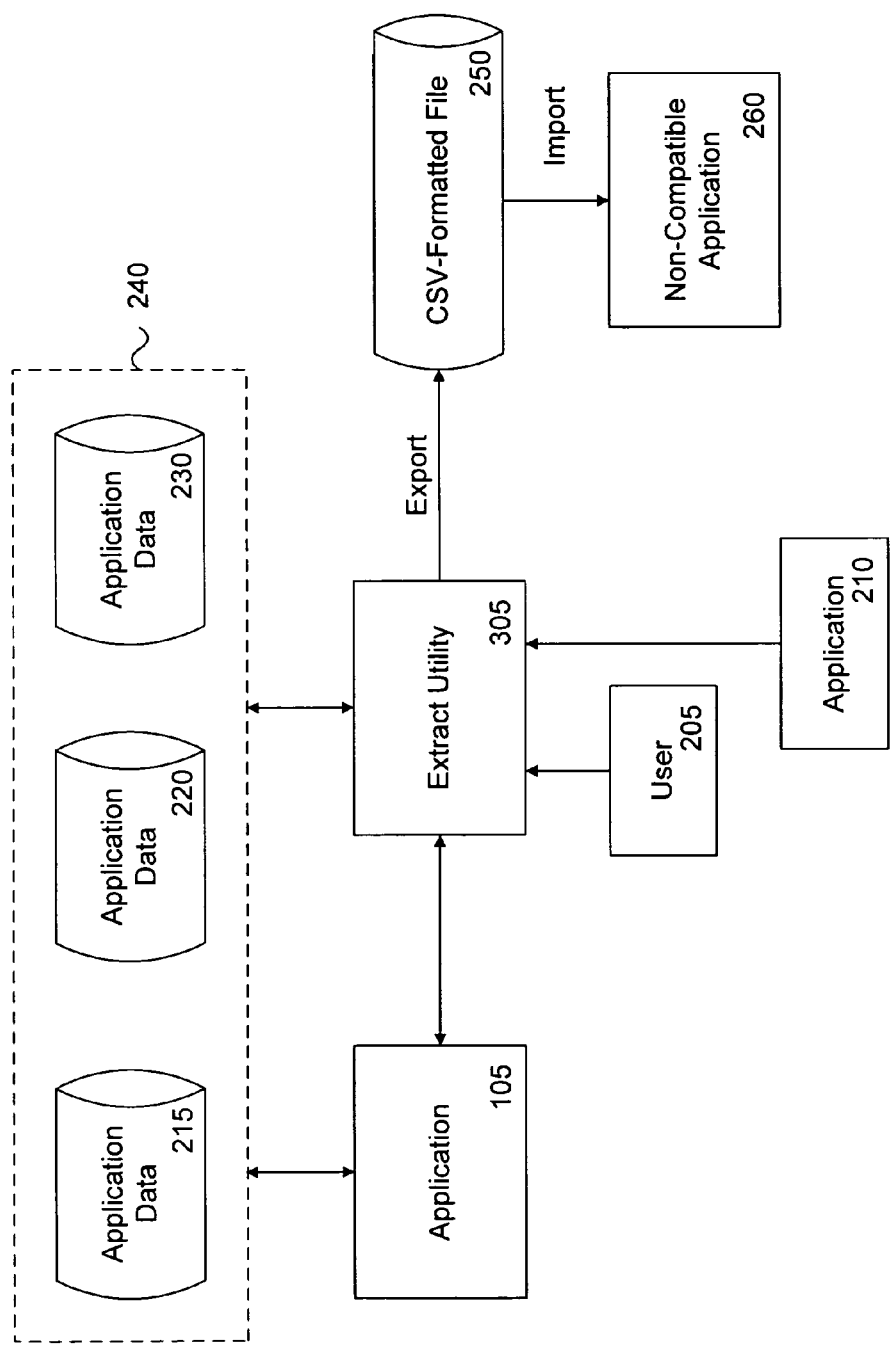
FIG. 3A is a block diagram illustrating a first example processing environment in which data is exported from a first software application in accordance with the present application.

Referring now to FIG. 3A, a schematic block diagram illustrates another example processing environment 300 in which data is transferred between two otherwise incompatible software applications 105 and 260. As illustrated, a user 205 or application 210 may request extract utility 305 to generate the non-proprietary extract file 250. If extract utility is authorized to access and determine the proprietary format of the data of data store 240, extract utility 305 may access the store of data 240 to generate the extract file 250.

Alternatively, extract utility 305 may not have the authorization to access, or may be unable to determine the proprietary format of, the application data 215, 220 and/or 230. In that case, extract utility 305 may request application 105 to provide the data to be extracted from the store of application data 240. The request from extract utility 305 may be an API call or may employ another request technique known to one of ordinary skill in the art.

In either case, the extract utility 305 generates extract file 250 which may be imported by application 260. The extract file 250 created by extract utility 305 enables data to be passed between two otherwise incompatible applications 105 and 260.

Figure 3B:
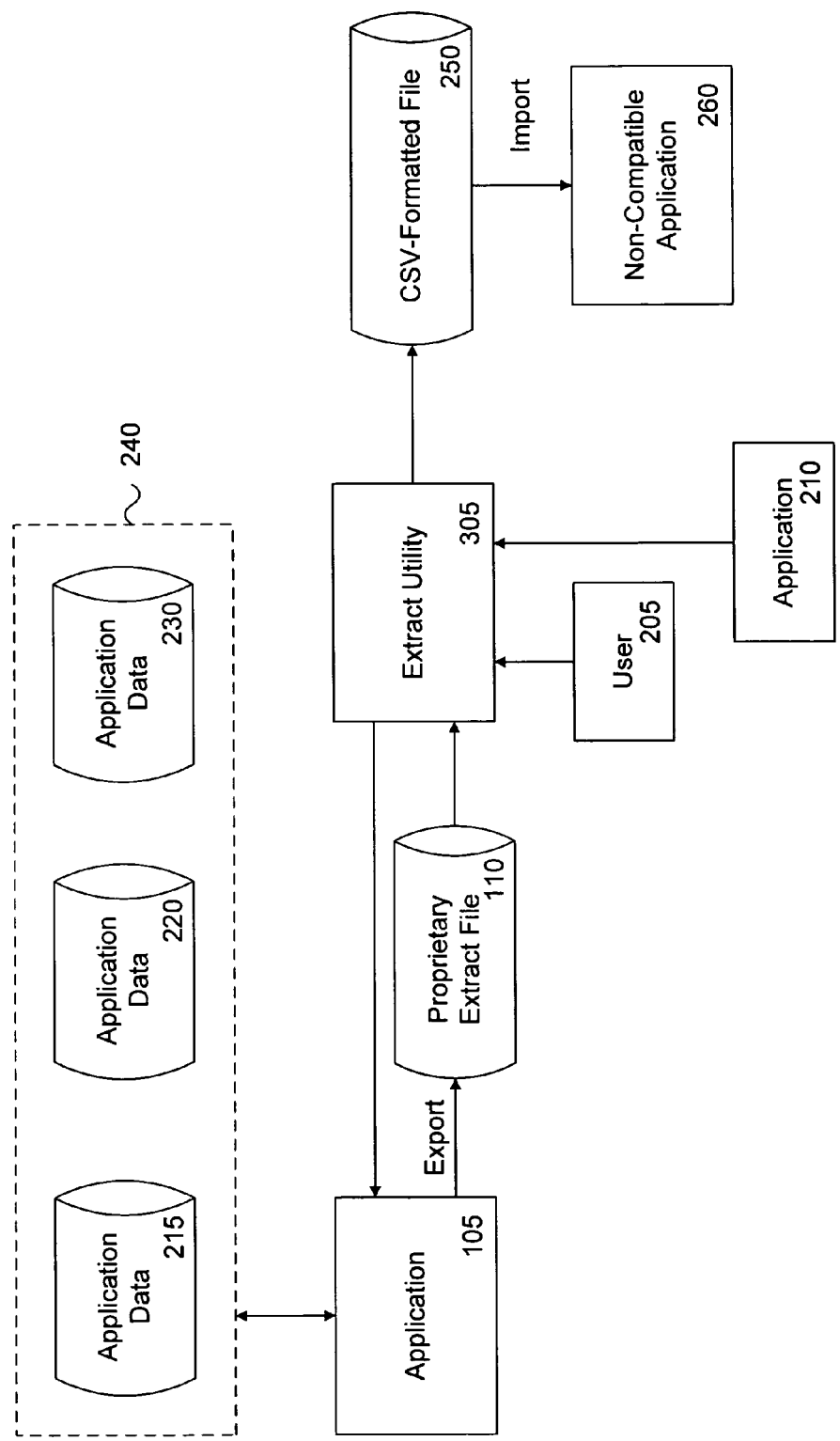
FIG. 3B is a block diagram illustrating a second example processing environment in which data is exported from a first software application in accordance with the present application.

Referring now to FIG. 3B, a schematic block diagram illustrates another example processing environment 350 in which data is transferred between two otherwise incompatible software applications 105 and 260. As illustrated, a user 205 or application 210 may request extract utility 305 to generate the non-proprietary extract file 250. As illustrated, extract utility 305 transmits to application 105 a request to export data to a proprietary extract file 110. In response, application 105 exports the requested data to proprietary extract file 110. The extract file may be a proprietary extract file that is incompatible with other non-proprietary applications.

Extract utility 305 accesses the proprietary extract file 110, determines the proprietary format of the file, and generates the non-proprietary extract file 250 based on the contents of file 110. The extract file 250 created by extract utility 305 enables data to be passed between two otherwise incompatible applications 105 and 260.

Figure 4:
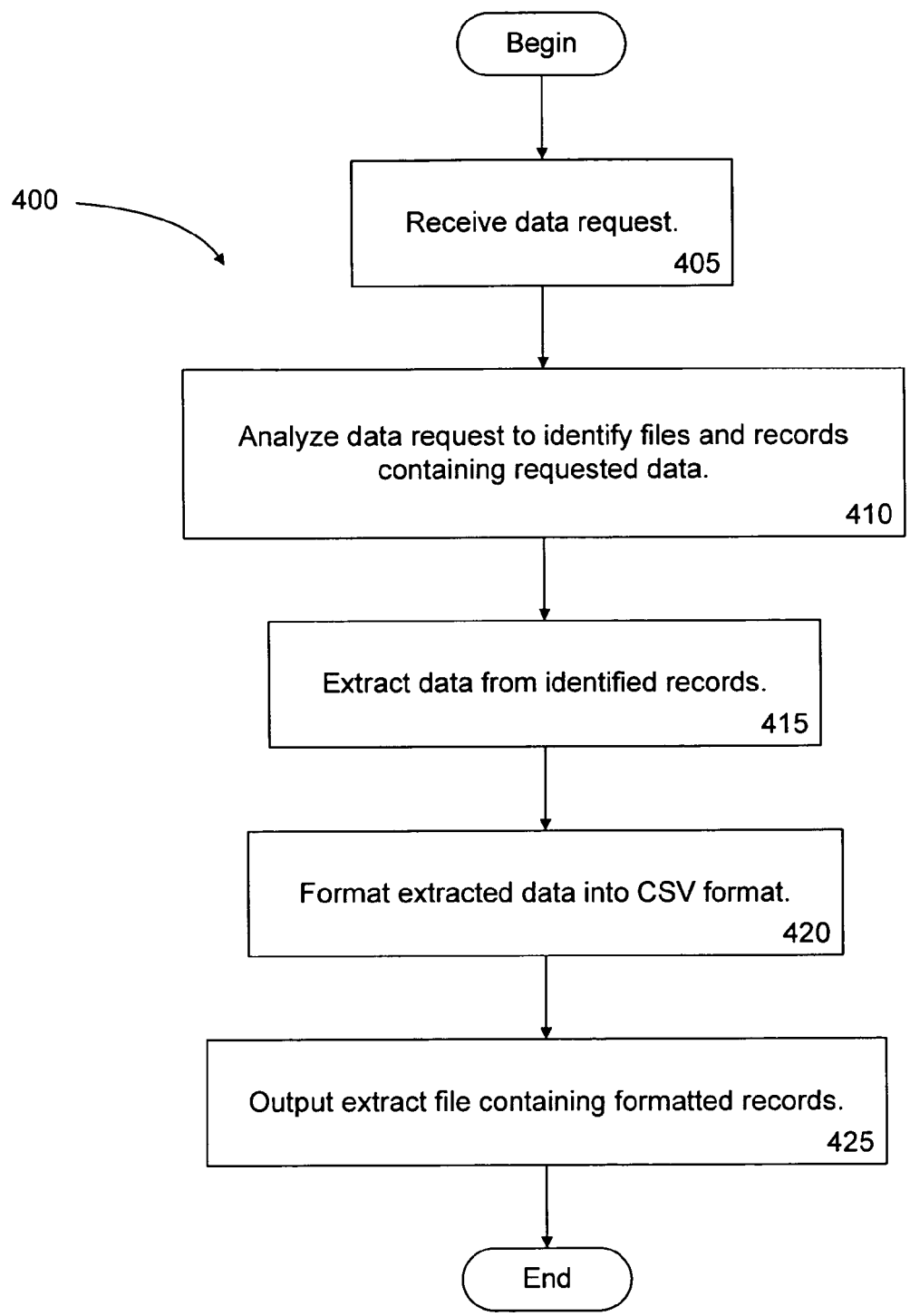
FIG. 4 is an example methodology for generating a CSV formatted extract file.

FIG. 4 is a flowchart illustrating an example method 300 for generating an extract file in a non-proprietary format. At block 405, a request for data is received. The request represents a request for a non-proprietary extract file to be generated. The data request is analyzed at block 410 and files and records are identified containing the requested data. At block 415, the data is extracted form the identified records of the identified files.

As should be clear from the description of FIGS. 3A and 3B above, blocks 405-415 may be accomplished in a number of alternative ways. For example, an extract utility, such as extract utility 305, having access to data store 240, may be solely responsible for performing blocks 405-415. Alternatively, extract utility 305 may request a proprietary application, such as application 105, to perform blocks 410 and/or 415. In such an alternate embodiment, block 415 may include transmitting the requested data from the application 105 to the extract utility 305, or it may include application 105 generating a proprietary extract file which may be interpreted by extract utility 305.

At block 420, the identified data is formatted into a non-proprietary format, such as CSV format. An extract file containing the formatted records is output at block 425.

The present application describes a software utility ("CSV Utility") for extracting data from a source software system, re-formatting the data into a non-proprietary format, such as CSV-format, and making the formatted extract file available to end-users. Following delivery of the CSV-formatted extract file, end-users may immediately import the file into commercially available third-party tools configured to accept CSV-formatted files. Alternatively, an end-user who wished to import data from a source software application into a custom-developed software application may do so with reduced development effort due to the familiar structure of the non-proprietary CSV file format versus the possibly unknown structure of the source system data format.

In one embodiment, the CSV Utility described in the present application is used to extract data from a source software system developed by Computer Associates International, Inc. ("CA"), the assignee of the present application. This source software application, entitled AllFusion Endevor Change Manager 4.0 ("Endevor") is a software tool that automates the management of the software development process—from initial design through distribution. Data used by Endevor includes data stored in Master Control Files ("MCF") and Package files, which are formatted based on a CA specification. In this embodiment of the present application, the source system's unique data format, the above described MCF and Package file record layouts, are extracted by a CSV utility, reformatted into a commonly used and easily integrated data format, and made accessible to users.

This described embodiment performs the task of reading the CA-specific data records and rendering them in the widely recognized format of CSV. Following the CSV utility's processing, an end-user can easily import this CSV-formatted data into a variety of commercially available software tools such as MICROSOFT® EXCEL and MICROSOFT® ACCESS, each of which is manufactured and marketed by MICROSOFT CORPORATION, or any other programs that support the CSV file type. Once imported, the data can be used for a wide variety of purposes, including the generation of custom-designed reports.

The CSV Utility may run as a stand-alone program on a user's computing system. In the above described embodiment of the CSV utility, where the CA AllFusion Endevor Change Manager is the source application, the CSV utility processes the steps described with reference to FIG. 3A to obtain source application data formatted in CSV. Specifically, a user formats a data request in the Source Coding Language ("SCL") syntax and submits the request as input to the CSV utility. SLC is the language Endevor uses to process batch requests.

The CSV utility analyzes the contents of the SCL statements and determines the CSV output. The CSV Utility calls Endevor API functions to obtain the requested data, which resides in Endevor MCF and Package Files. The data from the API responses are blocked into the CSV format and returned to the API where the data is written to the CSV formatted extract file.

What has been described above includes several examples. It is, of course, not possible to describe every conceivable combination of components or methodologies for purposes of describing the systems, apparatus, methods, and computer readable media associated with generating an extract file. However, one of ordinary skill in the art may recognize that further combinations and permutations are possible. Accordingly, this application is intended to embrace such alterations, modifications, and variations that fall within the scope of the appended claims. Furthermore, to the extent that the term "includes" is employed in the detailed description or the claims, such term is intended to be inclusive in a manner similar to the term "comprising" as that term is interpreted when employed as a transitional word in a claim.

What is claimed is:

1. A computer-implemented method for generating an extract file, comprising:
   receiving a request to generate a non-proprietary file that includes a plurality of extracted records associated with a proprietary software application, and in response, requesting at least one proprietary file from a software tool;
   receiving the at least one proprietary file from the software tool, the at least one proprietary file comprising the plurality of extracted records associated with the request, the proprietary file having an application specific format associated with the software tool;
   formatting, using a processor the extracted records according to a comma separated value format; and
   generating the non-proprietary file containing the formatted records.

2. The method of claim 1, wherein the at least one proprietary file includes a master control file.

3. The method of claim 1, wherein the at least one proprietary file includes a package file.

4. The method of claim 1, wherein the step of receiving the request includes receiving the request from a user.

5. The method of claim 1, wherein the step of receiving the request includes receiving the request from an application.

6. The method of claim 1, wherein the step of receiving the request includes receiving the request in a source coding language.

7. The method of claim 1, wherein the step of receiving at least one proprietary file includes calling an Application Programming Interface (API) to obtain one or more API responses containing the requested data.

8. The method of claim 7, wherein the step of formatting includes formatting the one or more API responses.

9. An apparatus for generating an extract file, comprising:
   a processor;
   a memory connected to said processor storing a program to control the operation of said processor;
   the processor operative with the program in the memory to:
      receive a request to generate a non-proprietary file that includes a plurality of extracted records associated with a proprietary software application, and in response, request at least one proprietary file from a software tool;
      receive the at least one proprietary file from the software tool, the at least one proprietary file comprising the plurality of extracted records associated with the request, the proprietary extract file having an application specific format associated with the software tool;
      format the extracted records according to a comma separated value format; and
      generate the non-proprietary file containing the formatted records.

10. The apparatus of claim 9, wherein the at least one proprietary file includes a master control file.

11. The apparatus of claim 9, wherein the at least one proprietary file includes a package file.

12. The apparatus of claim 9, wherein the processor is further operative with the program in the memory to receive the request from a user.

13. The apparatus of claim 9, wherein the processor is further operative with the program in the memory to receive the request from an application.

14. The apparatus of claim 9, wherein the processor is further operative with the program in the memory to receive the request in a source coding language.

15. The apparatus of claim 9, wherein the processor is further operative with the program in the memory to call an Application Programming Interface (API) to obtain one or more API responses containing the requested data.

16. The apparatus of claim 15, wherein the processor is further operative with the program in the memory to format the one or more API responses.

17. A computer-readable storage medium encoded with processing instructions for generating an extract file, the processing instructions for directing a computer to perform the steps of:
   receiving a request to generate a non-proprietary file that includes a plurality of extracted records associated with a proprietary software application, and in response, requesting at least one proprietary file from a software tool;
   receiving the at least one proprietary file from the software tool, the at least one proprietary extract file comprising the plurality of extracted records associated with the request, the at least one proprietary file having an application specific format associated with the software tool;
   formatting the extracted records according to a comma separated value format; and
   generating the non-proprietary file containing the formatted records.

18. The method of claim 1, further comprising:
   requesting that the extracted records be written to the proprietary file having the application specific format; and
   determining the application specific format of the proprietary file.

19. The apparatus of claim 9, wherein the processor is further operative with the program in the memory to:
   request that the extracted records be written to the proprietary file having the application specific format; and determine the application specific format of the proprietary file.

20. The method of claim 1, wherein the software tool automates management of a software development process from initial design through distribution.

21. The apparatus of claim 9, wherein the software tool automates management of a software development process from initial design through distribution.

* * * * *